United States Patent

Wiltz et al.

[15] 3,656,172

[45] Apr. 11, 1972

[54] IMPRESSION SENSING

[72] Inventors: Robert E. Wiltz, Wellesley; Edmund D. Schreiner, Newton, both of Mass.; Malcolm C. Winsor, Mount Vernon, Vt.

[73] Assignee: Athena Systems, Inc., Bedford, Mass.

[22] Filed: Apr. 27, 1970

[21] Appl. No.: 31,925

[52] U.S. Cl. ....................346/74 M, 235/61.11 C, 340/149 A

[51] Int. Cl. ....................................G06k 17/00, G01d 15/12

[58] Field of Search ...........346/74 M; 235/61.11 R, 61.11 C, 235/61.11 CR, 61.7 B; 340/149 A

[56] References Cited

UNITED STATES PATENTS

| | | | |
|---|---|---|---|
| 3,513,299 | 5/1970 | Loose | 235/61.11 R |
| 3,401,394 | 9/1968 | Leonard et al. | 346/74 M |
| 3,384,899 | 5/1968 | Lagerquist | 346/74 M |

*Primary Examiner*—Stanley M. Urynowicz, Jr.
*Assistant Examiner*—Gary M. Hoffman
*Attorney*—Charles Hieken

[57] ABSTRACT

Embossed OCR characters are sensed and converted into representative seven-bit words on magnetic tape with a timing bit recorded adjacent to each of the seven information bit positions. There are seven feeler pins each centered in a respective one of the four vertical and three horizontal segments that form a rectangular figure-of-eight. Associated with each pin is a narrow edge of low reluctance magnetic material that is urged away from and moved toward magnetic tape in response to the presence and absence, respectively, of a segment in an embossed character being sensed. The magnetic tape is backed by a pole of a permanent magnet, the other pole being magnetically coupled to the sensing elements so that the magnetic flux path is through a narrow edge and the tape. When the narrow edge is close to the tape, the magnetic field strength is sufficient to change the state of that small portion of the magnetic tape opposite the narrow edge to record there a binary one. When the narrow edge is away, the state of the magnetic tape opposite the narrow edge remains unchanged to record a binary zero. Adjacent to each movable narrow edge is a fixed sharp edge that records a one as a timing signal. In this manner the invention senses an embossed array of characters and converts them to a corresponding array of binarily encoded digital data on a magnetic tape that may then be electronically processed with computers or other utilization apparatus.

11 Claims, 9 Drawing Figures

INVENTORS
ROBERT E. WILTZ
EDMUND D. SCHREINER
MALCOLM C. WINSOR

BY Charles Hieken
ATTORNEYS

INVENTORS
ROBERT E. WILTZ
EDMUND D. SCHREINER
MALCOLM C. WINSOR
BY
Charles Hieken
ATTORNEYS INVENTORS
ROBERT E. WILTZ
EDMUND D. SCHREINER
MALCOLM C. WINSOR
BY
Charles Hieken
ATTORNEYS

IMPRESSION SENSING

BACKGROUND OF THE INVENTION

The present invention relates in general to impression sensing and more particularly concerns novel apparatus and techniques for converting embossed data on a card into binarily encoded data on magnetic tape for electronic processing while using essentially only the energy required to place the card in the reader as the source of energy for recording the data digitally. A system according to the invention is reliable, compact, relatively low in cost and easy to operate by relatively unskilled personnel.

There are over 200 million embossed plastic credit cards in use today. Typically the credit card number is embossed with a standard OCR (optical character readable) font in which the ten decimal numbers are represented by appropriate ones of the segments of a rectangular figure-of-eight. Typically the credit card number is printed upon a sales slip which also carries information on the amount being charged and the sales outlet to be credited. This information may then be manually translated into computer format, such as by punching data cards, automatically transferred through the use of optical character reading systems, or combinations of these techniques. For example, hand written numerals may be punched manually. One form of credit card printer allows the seller to select the total amount being charged for impression in OCR font on the sales slip and thereby permit completely automatic reading and translation to computer format.

The manual approach is obviously disadvantageous, and even the approach using automatic reading has serious problems. Dirt or other foreign material and poor imprinting impression may confuse the automatic reader. Handling the different sales slips is inconvenient. Moreover, it is not difficult to lose the individual slips, thereby losing the payment associated with a charged sale.

Accordingly, it is an important object of this invention to overcome one or more of the disadvantages enumerated above.

It is another object of this invention to provide means for sensing embossed characters.

It is another object of the invention to achieve one or more of the preceding objects while converting the embossed characters thus sensed into a representative sequence of binary words upon a recording medium.

It is a further object of the invention to achieve one or more of the objects set forth above while recording the data on magnetic tape.

It is still another object of the invention to achieve one or more of the preceding objects essentially without power.

It is still a further object of the invention to achieve one or more of the preceding objects with relatively simple apparatus that is relatively easy and inexpensive to fabricate and operates reliably for many cycles of operation.

It is a further object of the invention to achieve one or more of the preceding objects with compact apparatus that is rugged and operative by unskilled personnel.

SUMMARY OF THE INVENTION

According to the invention, there is a number of pin means in a predetermined arrangement for sensing the presence and absence of an embossing adjacent to the pin means, and means for sensing which of the pin means are in a first position and which of the pin means are in a second position to thereby encode the embossed character thus sensed. Preferably, there is a binary recording medium for recording in binary form a sequence of binary digits representative of the pin means in the first position and the pin means in the second position. Preferably, this recording medium is magnetic tape that receives a first binary digit when the pin means associated with a respective digit cell is in the first position and a second binary digit when the pin means is in the second position. Preferably, the pin means is mechanically coupled to a means for altering the magnetic state of an associated cell.

In a preferred form of the invention each pin means is associated with a mechanism whereby pivotal movement of the pin means about a predetermined axis produces corresponding pivotal movement about the axis of a writing element that produces a change of magnetic state when close to the magnetic tape and leaves the state unchanged when the writing element is away from the magnetic tape.

In a preferred form both the pin means and the writing element comprise parts of a common stamping residing in a stamped cradle element and pivotal about an axis generally parallel to the length of the magnetic tape. The stamping is preferably formed with a spring element beneath the pin means that rests against the cradle so as to urge the pin means normally upward. The stamping also preferably includes a generally J-shaped resilient element that carries the writing element so as to resiliently urge it against the magnetic tape when the pin means is down while moving essentially perpendicularly to the tape surface as the pin means moves up and down. Preferably the means for recording timing pulses is a stamping generally of the shape of the cradle formed with a writing element that is in a fixed position close to the magnetic tape.

Numerous other features, objects and advantages of the invention will become apparent from the following specification when read in connection with the accompanying drawing, in which:

DETAILED DESCRIPTION OF PREFERRED EMBODIMENTS

Figures 1, 2, 3:
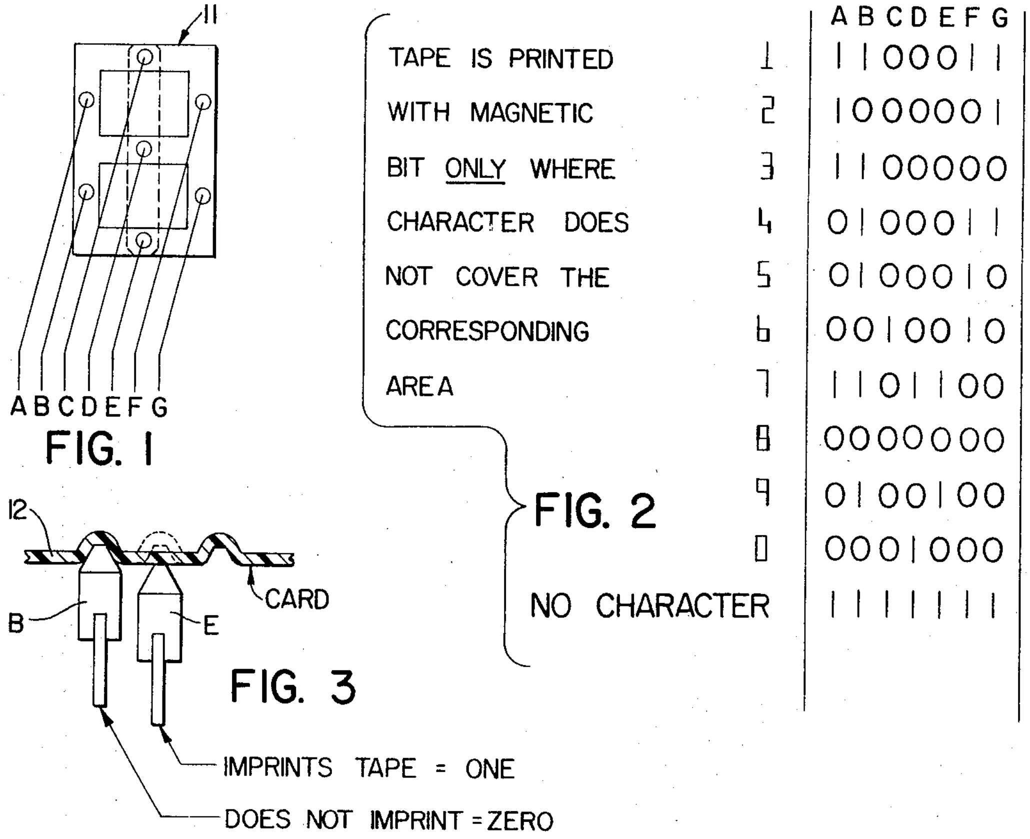
FIG. 1 illustrates the location of pin means in a rectangular figure-of-eight character sensing area.
FIG. 2 relates OCR numerals to seven-bit-words.
FIG. 3 is a side view showing two pins sensing impressions in an embossed card.

With reference now to the drawing and more particularly FIG. 1 thereof, there is shown a rectangular figure-of-eight scanning area 11 having feeler pins A–G centered in the four vertical and three horizontal segments making up the area. When an embossed character is centered over the sensing area and has a particular segment, the pin associated with that segment will sit in the groove formed thereby to produce no impression upon the tape, corresponding to the binary digit ZERO. The absence of such a segment will depress the associated pin and produce an impression upon the magnetic tape corresponding to the binary digit ONE. FIG. 3 shows a portion of a card 12 in section with a pin B raised in an embossed groove that would not imprint to record zero and a pin E depressed to produce an imprint upon the tape corresponding to the binary digit ONE. FIG. 2 is a table illustrating the ten decimal OCR digits and their corresponding seven-bit binary codes.

Figure 4:
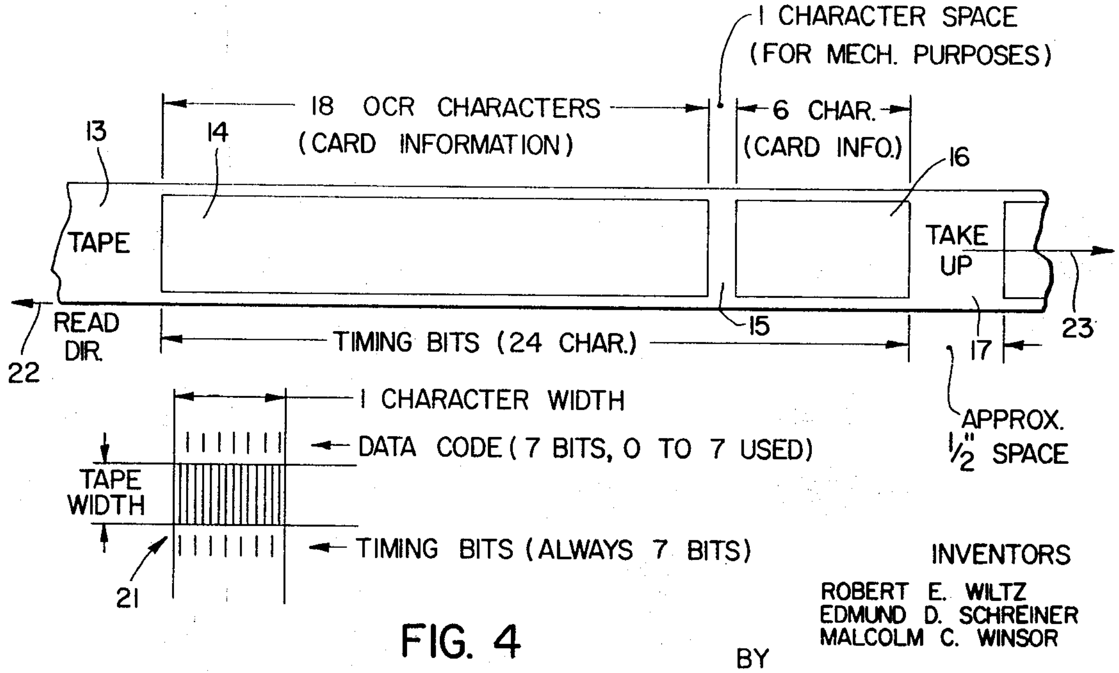
FIG. 4 illustrates a suitable tape format.

Referring to FIG. 4, there is shown a suitable tape format in which the magnetic tape 13 includes a first area 14 for accommodating eighteen binary words corresponding to eighteen OCR characters. There follows a gap 15 and a six-character space 16 with approximately a half inch in the space 17 between blocks of data associated with a particular card. A typical word space 21 contains 14 data bit cells with seven data bit cells alternating with seven timing bit cells. Arrow 22 designates the read direction for scanning the data previously written with a readout head. Arrow 23 indicates the takeup direction of the tape as data is recorded. In a typical system the tape is stationary while the data is being magnetically recorded. The tape may then be mechanically advanced by the space for 25 character plus one-half inch to accommodate the next block of information related to the next card.

With the format illustrated the first 18 characters may be representative of the account; the next six, of the amount to be charged. A feature of the invention is that when the magnetic tape is in a cassette, only the cassette need be sent to the central billing data processing center. The cassette may then be rapidly scanned by the computer and entered directly into the computer without manual intervention. Furthermore, having everything on the cassette in sequence minimizes the chance that data on a single sale will be lost. The first card recorded on each cassette may be that identifying the retail outlet so that the computer need not derive this information from each transaction.

Figures 5, 8, 9:
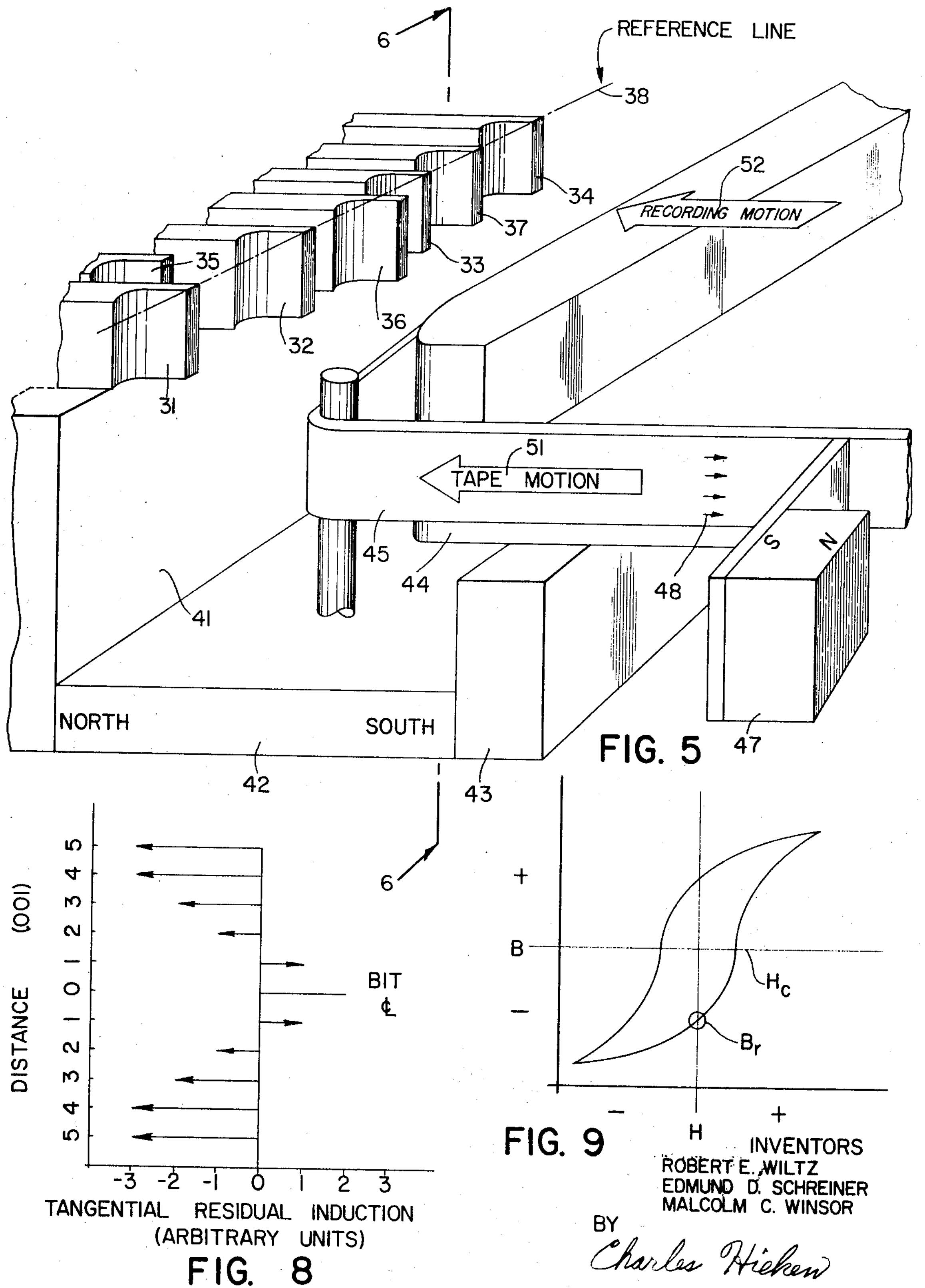
FIG. 5 is an enlarged perspective view of that portion of the system for recording the data on the magnetic tape.
FIG. 8 shows a typical recorded pattern.
FIG. 9 shows a typical hysteresis loop.

Referring to FIG. 5, there is shown a perspective view of portions of a preferred system for recording digital data on magnetic tape according to the invention. In order to avoid obscuring the principles of the invention certain portions are omitted and there is shown only four timing writing elements 31, 32, 33 and 34 and only three data bit writing elements 35, 36 and 37. The clock writing elements 31–34 are always positioned in the plane defined by reference line 38 to always write a ONE as a timing bit. The plane parallel to the tape surface and passing through reference line 38 is immediately adjacent to the plane of the tape during recording when the tape assembly moves toward this plane as described below.

Each of elements 35, 36 and 37 are associated with respective ones of pins A–G. Writing element 35 is associated with a pin that has moved up into a groove and is therefore withdrawn from the plane of reference line 38 to record a ZERO. Writing elements 36 and 37 are associated with pins that are depressed and hence record binary ONE. Element 37 is not fully depressed as might occur when its associated pin senses a warped portion of the credit card. However, the system has enough tolerance to still correctly record ONE.

The writing elements 31–37 are made of high reluctance magnetic material and preferably are formed to terminate in a narrow rectangular face as indicated to enhance the recording resolution. The elements 31–37 slide upon the upper face of the vertical member 41 of low reluctance magnetic material adjacent to one pole of the permanent writing magnet 42. The other pole of permanent writing magnet 42 is adjacent to a shorter vertical member of low reluctance magnetic material which carries a backing plate member 44 of generally L-shaped cross section that presses against the back surface of magnetic tape 45. Thus, those of the writing elements that contact magnetic tape 45 establish a high flux density across the tape to member 44 to record a binary ONE when member 44 moves tape 45 toward reference line 38 to effect recording.

Biasing permanent magnet 47 biases the magnetic tape 45 in the direction indicated by arrows 48 as the tape moves in the direction indicated by arrow 51.

Magnetic tape 45 is typically of mylar or similar commercial plastic material about 0.0015 in. thick with a magnetizable coating of magnetic iron oxide particles in a binder deposited to a thickness of substantially 0.0002 in. As is well known signals may be recorded by alternation of the direction of the longitudinal magnetic intensity within the oxide coated layer. In the embodiment of the invention shown the recording is accomplished in two steps. First, biasing magnet 47 prebiases or erases the tape 45 as it moves in the direction of arrow 51 preparatory to receiving the next block of data. Second, elements 31–37, bar magnet 42 and associated magnetic circuitry record the data as member 44 moves tape 45 toward reference line 38. As indicated above, a length of tape sufficient to accommodate the recording is drawn from a supply reel (not shown), typically a cassette, and passed in contact with the pre-biasing magnet 47 to orient the iron oxide domains within the coatings in the direction indicated by the arrows 48.

Tape thus biased will produce only very small noise signals during playback. The biased tape over magnetically permeable backing plate 44, typically of soft iron or mild steel, is magnetically coupled to the south pole of actuating bar magnet 42 through member 43 sufficiently weakly so that the induced pole in the backing plate 44 will not affect the magnetic state of the tape recording of the pattern established by elements 31–34, 36 and 37 as backing plate 44 advances tape 45 toward the reference line 38 along the line of direction indicated by arrow 52 to record.

The specific means for advancing backing plate 44 may be a manually actuated lever mechanism within the skill of those having ordinary skill in the art. Preferably actuation occurs simultaneously with the actuation of a carriage that produces an impression of the credit card on a sales slip.

When the tape 45 is urged against the writing elements 31–37, the self-adapting structure of each writing element in the plane of reference line 38 insures that it will be in close contact with the magnetic surface of tape 45. The mere presence of backing plate 44 concentrates the magnetic field of a contacting writing element, such as 31–34, 36 and 37 to an intensity sufficient to reverse the magnetic state of the coating in the neighborhood of each of these writing elements. Because of the self-demagnetizing effect of adjacent nonreversed regions of the coating, the resultant recorded pattern assumes the form shown in FIG. 8. The abscissa and ordinates represent respectively tangential residual magnetic induction in arbitrary units and mils to the right and left of the center of a data bit cell carrying the bit ONE. The physical process is such that a recorded bit occupies a distance along the tape of approximately 5 mils.

The magnetic field flowing through a withdrawn writing element, such as 35, is too low in intensity to overcome the flux reversing threshold designated $H_c$ in the hysteresis loop of FIG. 9. Thus, the mobile writing elements which are not depressed by the actuating credit card do not affect the magnetic tape and will not produce a signal during playback.

The data recording which typically results from the operations previously described consists of a regular set of recorded pulses on the tape at intervals of 0.01 in. center-to-center. There are fourteen pulse positions for each character code. Seven of these are always recorded at intervals of 0.020 in. and form a set of timing pulses to facilitate recovery of the data. The spaces between each timing pulse store variable data of the character code.

This data may be recovered by standard electronic methods of amplification and binary quantization of the impulse signals and by electronic gating of the interval following each fixed timing pulse to detect the occurrence or nonoccurrence of a data pulse. The seven binary digits thus detected represent uniquely the symbols sensed in a seven-bit code. This code may be transformed to standard codes, such as BCD, or ASCII by a table or decoding matrix or other suitable arrangement well known in the digital data processing field.

Figure 6:
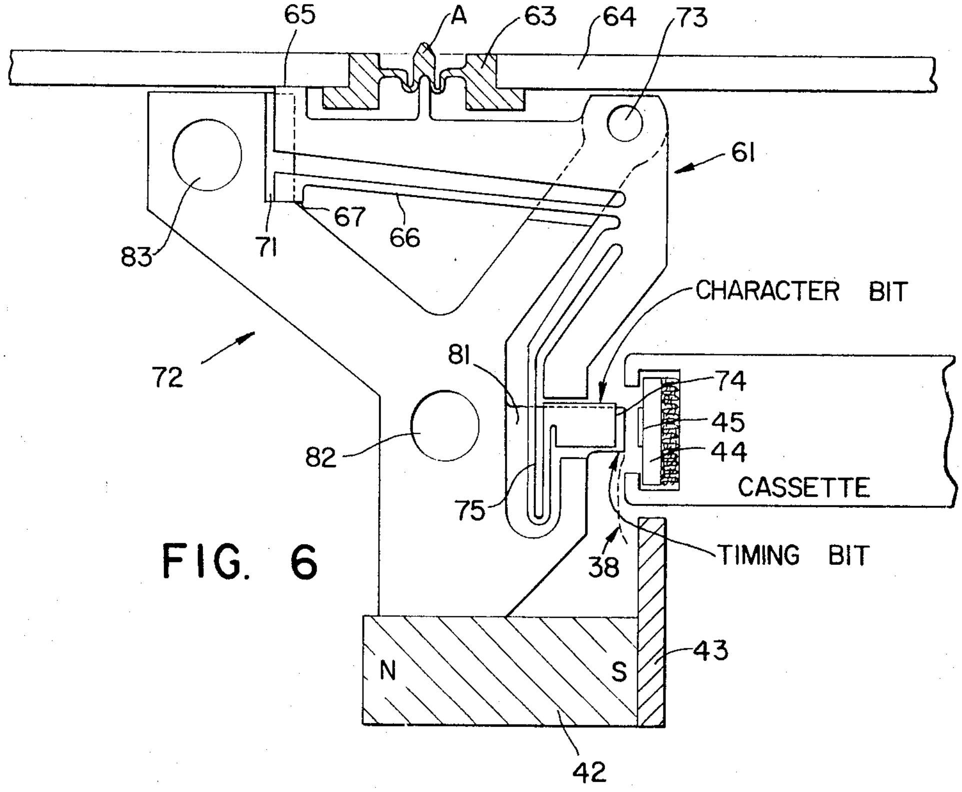
FIG. 6 is a sectional view of the character sensor showing a moving sensor arm with an adjacent timing bit.

Referring to FIG. 6, there is shown a sectional view of the character sensor according to the invention generally through section 6—6 of FIG. 5 showing one of the moving sensor arms with an adjacent timing bit element. There is a sensor arm like 61 associated with each of the seven sensing pins A–G. Each sensor arm is preferably a unitary stamping formed with a feeler pin 62 that urges the associated pin such as A upward when beneath an embossed groove. The pins such as A are resiliently supported in an assembly such as 63 that is seated in the character sensing opening of a base plate 64 that supports a credit card to be read. Sensor arm 61 is formed with an upper tab 65 that contacts the underside of base plate 64 to limit the upward travel of feeler pin 62.

Sensor arm 61 is also formed with a spring element 66 having a depending tab 67 that rests upon a shoulder 71 of cradle 72 to normally urge feeler pin 62 up as shown. The flat surface of a credit card may depress pin A and feeler pin 62 to rotate sensor arm 61 about the horizontal axis 73 and move writing element 74 toward the tape 45.

Sensor arm 61 is also formed with a generally J-shaped portion 75 that carries writing element 74 and functions as a spring that helps keep writing element 74 against the tape when the tape is advanced toward reference line 38. An advantage of this particular arrangement is that the movement of writing element 74 is essentially horizontal to insure good contact of its face with the tape to record a solid signal.

Cradle 72 rests upon the north pole of actuating bar magnet 42 and carries magnetic flux that biases writing element 74 as a north pole.

Timing element 81 is shaped somewhat similarly to cradle 72 and includes a generally J-shaped portion like sensor arm 61 functioning as a spring to keep timing element 81 in fixed position in good contact with the tape. The cradles and timing elements alternate and are closely adjacent over large axles 82 and 83 and a smaller axle that embraces pivot point 73 over which the moving sensors such as 61 are put together.

The feeler pins 62 are positioned to be beneath an associated one of the pins A–G. The elements are sufficiently thin so that seven moving sensors and seven timing bit plates fit along an actual length of only 0.140 in.

Figure 7:
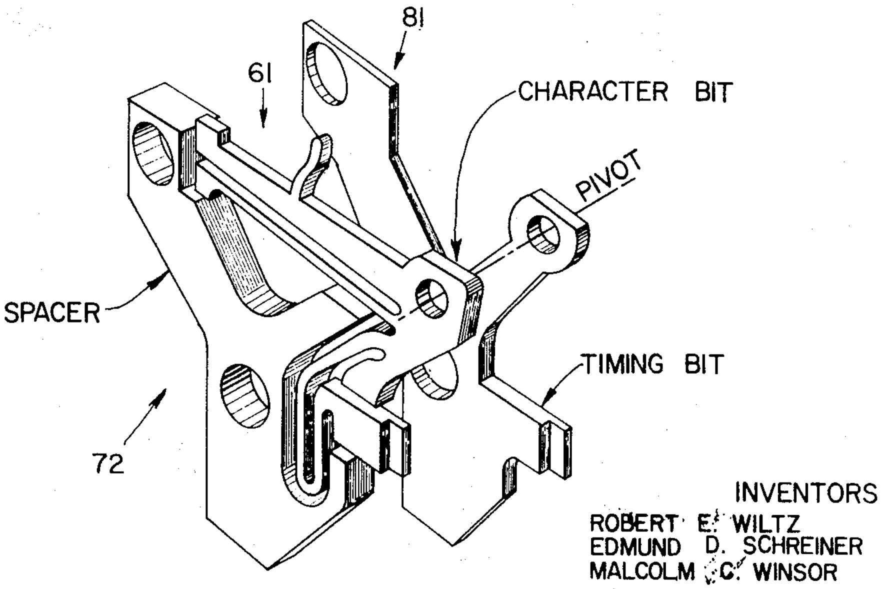
FIG. 7 is a perspective view partially exploded showing the moving sensor arm, cradle and timing bit member.

Referring to FIG. 7, there is shown an exploded perspective view of moving sensors 61, cradle 72 and timing plate 81 helpful in understanding the nature of these structures.

The invention has numerous applications. When used in connection with a credit card sale, the seller may select the number corresponding to the sale to be charged for reading by a similar mechanism so that the cassette will record the credit card number and the amount of the sale. The principles of the invention may also be used to record data on paper tape, for example. The tape might be punched to indicate a ONE, it could be inked, or the tape could be electrosensitive tape and electrostatically marked. Alternately, the feeler pins might actuate mechanical or magnetic reed switches to signal the embossed character sensed.

Alternately, the two positions of the recording elements could be sensed by passage of a magnetic head or by a photosensitive pickup arranged to be shadowed by the presence of a bit or by other means which can distinguish a spatial displacement of the order of 0.020 in.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for sensing embossed characters comprising,
   a plurality of pin means located in a character sensing area each of which assumes one of first and second positions representative of the character embossing in the sensing area,
   and means for detecting the positions of said pin means to provide a binary encoded representation of the character in the sensing area thus sensed,
   said means for detecting comprising tape means for recording first and second signals in sequence representative of the positions assumed by said pin means,
   and a corresponding plurality of writing elements mechanically linked to a respective one of said pin means movable between a first position close to said tape and a second position away from said tape to thereby record said first and second positions respectively on said tape.

2. Apparatus in accordance with claim 1 wherein said tape is magnetic.

3. Apparatus in accordance with claim 2 wherein said corresponding plurality of writing elements are,
   a corresponding plurality of magnetic writing elements mechanically linked to a respective one of said pin means movable between a first position close to said tape and a second position away from said tape to thereby record said first and second positions respectively on said tape.

4. Apparatus in accordance with claim 3 and further comprising,
   a corresponding plurality of timing bit writing elements alternating with said first-mentioned writing elements for always writing timing pulses upon said tape to define an information bit cell between adjacent timing pulses.

5. Apparatus in accordance with claim 4 and further comprising,
   a source of magnetic flux coupled to said writing elements for changing the state of the portion of said tape opposite a writing element in said first position close to said tape.

6. Apparatus in accordance with claim 5 and further comprising,
   a biasing source of magnetic flux close to said tape for establishing a predetermined state on said tape before said tape passes by said writing elements.

7. Apparatus in accordance with claim 5 wherein each of said writing elements includes a J-shaped portion terminating in a narrow face for confining the magnetic flux delivered through said face to said tape to a narrow portion along the length of said tape.

8. Apparatus in accordance with claim 7 wherein each of said writing elements includes said J-shaped portion suspended from a sensor arm formed with a spring element having a depending tab and further comprising,
   shoulder means for supporting said depending tab to normally urge said sensor arm against an associated pin means.

9. Apparatus in accordance with claim 3 wherein each of said writing elements includes a J-shaped portion terminating in a narrow face for confining the magnetic flux delivered through said face to said tape to a narrow portion along the length of said tape.

10. Apparatus in accordance with claim 9 wherein each of said writing elements includes a J-shaped portion suspended from a sensor arm formed with a spring element having a depending tab and further comprising,
    shoulder means for supporting said depending tab to normally urge said sensor arm against an associated pin means.

11. Apparatus in accordance with claim 9 and further comprising,
    a backer plate of low reluctance magnetic material behind said tape for coacting with said narrow faces to confine said flux.

* * * * *